Aug. 29, 1933.   A. M. FLANDERS ET AL   1,924,778
AUTOMOBILE SIGNAL
Filed Dec. 6, 1932
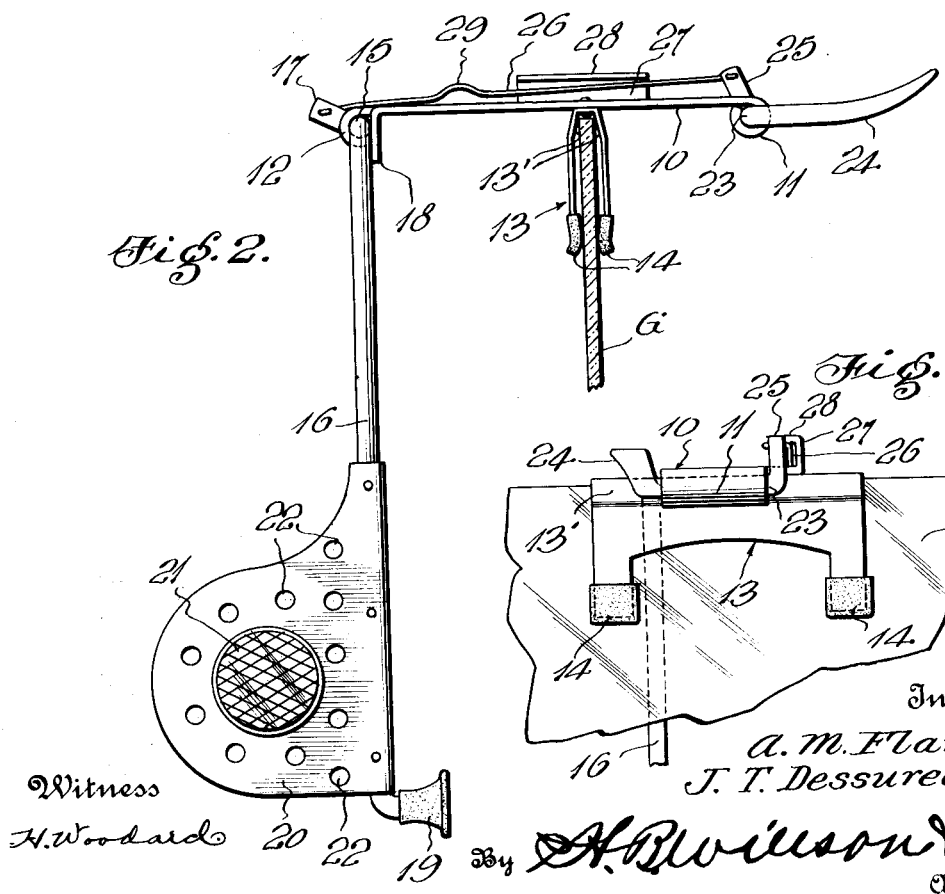
Inventors
A. M. Flanders
J. T. Dessureau Patented Aug. 29, 1933

1,924,778

UNITED STATES PATENT OFFICE 1,924,778

AUTOMOBILE SIGNAL

Allen M. Flanders and Joseph T. Dessureau,
Barre, Vt.

Application December 6, 1932. Serial No. 646,008

9 Claims. (Cl. 116—52)

The invention aims to provide an exceptionally simple and inexpensive, yet an efficient, desirable and convenient device which may be quickly and easily attached to an automobile and advantageously used for signalling when the car is to be turned or stopped.

With the foregoing in view, the invention resides in the novel subject matter hereinafter described and claimed, description being accomplished by reference to the accompanying drawing.

Fig. 1 is a top plan view.
Fig. 2 is a rear edge view.
Fig. 3 is an inner side elevation.

A preferred construction has been illustrated and will be specifically described, with the understanding however, that within the scope of the invention as claimed, variations may be made.

In the drawing above briefly described, the number 10 denotes a flat horizontally elongated sheet metal plate having its inner and outer ends bent to provide parallel tubular bearings 11 and 12 for disposition at the interior and exterior respectively of a closed automobile body, the plate 10 being adapted to extend over a partly lowered window glass and being provided with a rigidly attached clip 13 formed from spring metal. This clip is arched to straddle the window glass G and the upper portions of the clip legs are disposed in downwardly diverging relation as denoted at 13', to snugly engage the glass G, regardless of the thickness of the latter. Each leg of the clip is preferably bifurcated and the furcations may well be provided with tips 14 of rubber or the like to anti-slippingly engage the window glass.

A rock shaft 15 carrying a signal arm 16, is mounted in the external bearing 12 and is provided at one end with a crank arm 17, said signal arm 16 normally hanging downwardly against a stop 18 which limits its descent. This stop is preferably stamped downwardly from the plate 10. The lower end of the signal arm 16 preferably carries a bumper 19 of rubber or the like to engage the side of the car body in case the entire signal and window glass should be lowered to such an extent as to otherwise permit said arm to strike the body. This lower end of the arm 16 preferably carries a signal plate 20 having a reflector 21 which may well be of red or other desired color, said plate 20 preferably having perforations 22 to decrease wind resistance.

A rock shaft 23 equipped with a handle 24, is mounted in the internal bearing 11 and is provided on one end with a crank arm 25. A rod or link 26 extends between the two crank arms 25 and 17 and is pivoted to both of said crank arms, so that when the normally raised handle 24 is lowered, it will pull upon the rod or link 26 and upwardly swing the signal arm 16.

One edge of the plate 10 is provided with an upwardly bent flange 27 at one side of the rod or link 26, and the upper edge of said flange 27 is provided with a horizontal flange 28 which overlies said rod or link. The flanges 27—28 thus constitute a stop to strike the upper end of the window frame and limit ascent of the window glass, so that the rod or link 26 cannot be bent and cannot be tightly bound between the glass and the frame.

Preferably, the rod or link 26 is provided with a bowed portion 29 which is adapted to yieldably engage the flange 28 when the parts are in signal-extended position, so that said parts will remain in said position until the handle 24 is again forced upwardly.

It will be seen from the foregoing that an exceptionally simple and inexpensive device has been provided which may be quickly and easily attached, and that it may be conveniently used for signalling when the car is to be stopped or turned, without the necessity of lowering the window sufficiently to permit the driver to extend his hand. It will be observed however, that the signal possesses no parts which will interfere with lowering of the window if desired, and when said window is lowered and the signal arm 19 lies at the outer side of the car body, the bumper 19 will prevent said arm from marring the body when it swings downwardly and inwardly to its normal position.

While excellent results are obtainable from the details disclosed, attention is again invited to the fact that variations may be made within the scope of the invention as claimed.

We claim:—

1. An automobile signal comprising a horizontal plate adapted to extend over a partly lowered automobile window glass, said plate having its ends bent to provide two parallel tubular bearings for disposition at the exterior and interior of the automobile respectively, a signal-carrying rock shaft mounted in the external bearing and having a crank arm on one end, a handle-equipped rock shaft mounted in the internal bearing and having a crank arm on one end, and a link extending between and pivoted to said crank arms.

2. An automobile signal comprising a clip to straddle the upper end of a partly lowered automobile window glass, a horizontal plate secured between its ends to the upper end of said clip, said plate having parallel tubular bearings on its ends for disposition at the exterior and interior of the automobile respectively, a signal-carrying rock shaft mounted in the external bearing and having a crank arm at one end, a handle-equipped rock shaft mounted in the internal bearing and having a crank arm at one end, a link over said plate extending between and pivoted to said crank arms, and a stop carried by and projecting upwardly from said plate, said stop being of a height to strike the upper end of the window frame to so limit ascent of the window glass as to prevent striking of said link against said frame end.

3. An automobile signal comprising a clip to straddle the upper end of a partly lowered automobile window glass, a horizontal plate secured between its ends to the upper end of said clip, said plate having parallel tubular bearings on its ends for disposition at the exterior and interior of the automobile respectively, a signal-carrying rock shaft mounted in the external bearing and having a crank arm at one end, a handle-equipped rock shaft mounted in the internal bearing and having a crank arm at one end, a link over said plate extending between and pivoted to said crank arms, a vertical flange carried by and projecting upwardly from said plate at one side of said link, and a horizontal flange projecting laterally from the upper edge of said vertical flange and overlying said link, said horizontal flange being adapted to strike the upper end of the window frame to limit ascent of the window glass.

4. A structure as specified in claim 2; said link having a bowed portion to yieldably contact with said stop to hold the shafts and link in signal-extended position.

5. A structure as specified in claim 3; said link having a bowed portion to yieldably contact with said horizontal flange to hold the shafts and link in signal-extended position.

6. An automobile signal comprising a horizontal plate adapted to extend over a partly lowered automobile window glass, said plate having its ends bent to provide two parallel tubular bearings for disposition at the exterior and interior of the automobile respectively, a longitudinal edge of said plate being bent upwardly and then laterally to provide vertical and horizontal flanges, the latter of which overlies the plate, a signal-carrying rock shaft mounted in the external bearing and having a crank arm on one end, a handle-equipped rock shaft mounted in the internal bearing and having a crank arm on one end, and a link extending between and pivoted to said crank arms, said link being disposed under said horizontal flange.

7. An automobile signal comprising a horizontal plate adapted to extend over a partly lowered automobile window glass, said plate having its ends bent to provide two parallel tubular bearings for disposition at the exterior and interior of the automobile respectively, a longitudinal edge of said plate being bent upwardly and then laterally to provide vertical and horizontal flanges, the latter of which overlies the plate, a signal-carrying rock shaft mounted in the external bearing and having a crank arm on one end, a handle-equipped rock shaft mounted in the internal bearing and having a crank arm on one end, and a link extending between and pivoted to said crank arms, said link being disposed under said horizontal flange, said link having a bowed portion to yieldably engage said horizontal flange when the link is in signal-extended position.

8. An automobile signal comprising a clip to straddle the upper end of a partly lowered window glass, said clip being constructed to prevent interference with lowering said window glass, a horizontal support secured to said clip and projecting both outwardly and inwardly therefrom, said support being also constructed to prevent it from interfering with lowering of the window glass, an exposed signal arm pivotally hung from the outer end of said support and spaced outwardly from said clip to lie at the exterior of the car body when the window glass is lowered, a handle mounted on the inner end of said support and located to prevent interference with lowering of the window glass, operating connections between said handle and said signal arm, means for limiting the downward and inward swinging of said signal arm, and a bumper on said arm to prevent marring of the car body when said arm descends.

9. An automobile signal comprising a support having bearings for disposition at the exterior and interior of an automobile body respectively, a signal-carrying rock shaft mounted in the external bearing and having a crank arm, a handle-equipped rock shaft mounted in the internal bearing and also having a crank arm, a resilient metal link connecting the two crank arms and having a laterally bowed portion between its ends, and fixed means on said support engageable by said bowed link portion for holding the shafts and link in signal-projected position.

ALLEN M. FLANDERS.
JOSEPH T. DESSUREAU.